United States Patent [19]

Shipman

[11] 3,969,783

[45] July 20, 1976

[54] COMBINATION WINDSHIELD WASHER/WIPER

[76] Inventor: William A. Shipman, 6 Eastshore Blvd., Timberlake, Ohio 44094

[22] Filed: June 4, 1975

[21] Appl. No.: 583,642

[52] U.S. Cl. ............................................. 15/250.04
[51] Int. Cl.². ............................................ B60S 1/46
[58] Field of Search .................... 15/250.01–250.09

[56] References Cited
UNITED STATES PATENTS

| | | | |
|---|---|---|---|
| 3,418,676 | 12/1968 | Byczkowski et al. | 15/250.04 |
| 3,881,212 | 5/1975 | Regler | 15/250.04 |

Primary Examiner—Peter Feldman
Attorney, Agent, or Firm—William N. Hogg

[57] ABSTRACT

A combination windshield washer and wiper blade used in combination with a pump and reservoir is disclosed. The blade has a hollow center portion with openings leading therefrom to allow flow of fluid therethrough. The hollow central portion is connected by a flexible tube to the reservoir so that when the wiper assembly of the car is actuated the reservoir will pump fluid to the blade which will apply the fluid as a thin film to wash and wipe the windshield.

1 Claim, 4 Drawing Figures

COMBINATION WINDSHIELD WASHER/WIPER

BACKGROUND OF THE INVENTION

This invention relates generally to washing and wiping of automobile windshields, and more particularly to a combination blade for washing and wiping automobile windshields in which the blade acts as a device for applying the washing fluid as well as for wiping the windshield clean.

The conventional present manner of washing windshields of automobiles is to provide a reservoir of washing fluid with an associated pump and to lead this fluid to a nozzle fixed on the car which will squirt the water on the windshield through the action of the pump. The wiper blade then wipes the water which has been squirted.

While this type of arrangement is quite useful, nevertheless it has many drawbacks. These drawbacks include the fact that often the nozzle is misdirected, or can become misdirected and not spray the washing fluid either where it is desired or in fact sometimes not even spray it on the windshield at all. Also, the spray may become misdirected by reason of the action of the wind. Additionally the small orifice opening in the nozzle may become clogged quite easily and/or tend to freeze in extremely cold weather.

SUMMARY OF THE PRESENT INVENTION

According to the present invention a combination washer and wiper blade for washing and wiping the windshield of an automobile is provided which is used in combination with a reservoir and pump wherein the wiper blade has a hollow central portion. A flexible tube leads from this hollow central portion to a reservoir and pump for fluid to allow the fluid to be carried into the central hollow portion of the blade. A plurality of openings are provided communicating with the central opening to allow fluid to be dispersed from these openings onto the windshield thereby applying the fluid directly to the windshield as the blade is working to thereby allow the blade to operate as both a washing and wiping device.

DESCRIPTION OF THE PREFERRED EMBODIMENT

Figure 1:
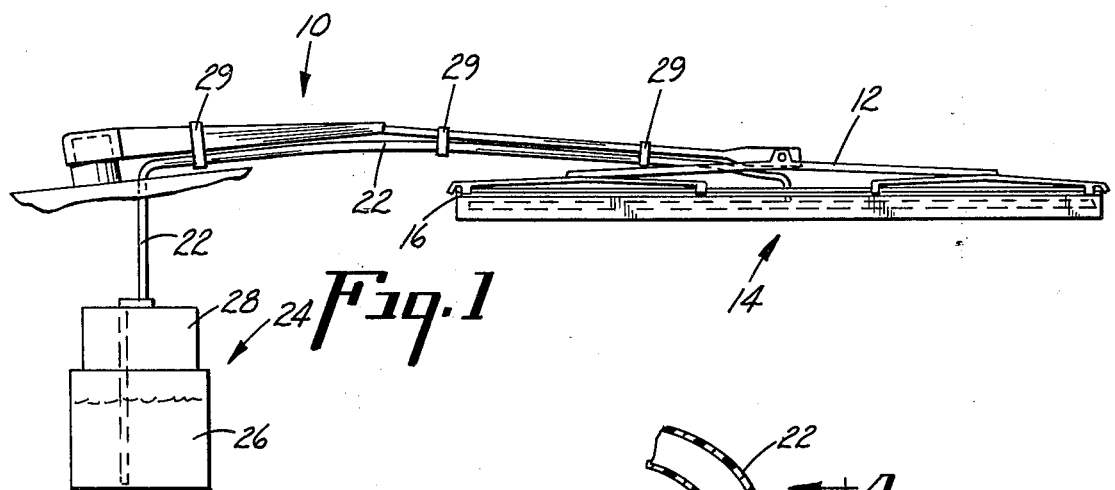
FIG. 1 is an elevational view of a combination washing and wiping blade of this invention utilized in an automotive application secured to a reservoir assembly according to this invention.
Figure 2:
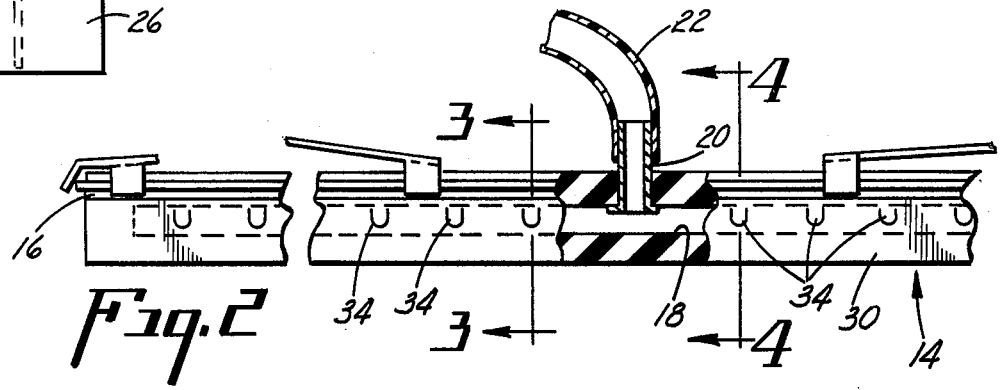
FIG. 2 is a detailed view partially in section of a portion of the blade of this invention.

Referring now to the drawing, a combined automobile windshield washing and wiping blade in combination with a fluid supply reservoir system according to this invention is shown. The device is shown in conjunction with a conventional automotive wiper arm designated generally as 10 having blade securing device 12 at the end thereof. The invention includes an elongated blade designated generally 14 made out of an elastomeric material preferably synthetic or natural rubber, having a consistency which will provide a necessary squeegee action when operating against a windshield as is well known in the art. The blade 14 is generally triangular in cross-section and along one leg thereof a groove 16 is provided for mounting the blade to the blade securing device 12 in a manner which will allow the blade to be secured thereto which is conventional in the art and does not per se form a part of the invention.

The blade 14 is provided with a hollow central longitudinally extending portion 18 which is closed at both ends of the blade and thus acts as a fluid receiving and retaining pocket within the blade 14. A fitting 20 is provided which extends through the blade 14 on the top thereof adjacent the portion of the blade that is connected to the blade securing device 12 and provides communication with the hollow central portion 18. A flexible tube 22 is provided, one end of which is secured to the fitting 20, the other end of which is secured to a fluid supply assembly 24 which is comprised of a fluid reservoir 26 and a pump 28. The reservoir 26 and pump 28 are of conventional design and are provided basically as standard equipment on most cars and are operable by a lever or button utilized in conjunction with the operating lever for the wiper blades and the assembly per se does not constitute a part of this invention. In order to properly secure the flexible tube 22 a series of clamps 29 are provided which clamp the tube to the wiper arm 10, thereby preventing entanglement and keeping the tube properly positioned.

Figure 3:
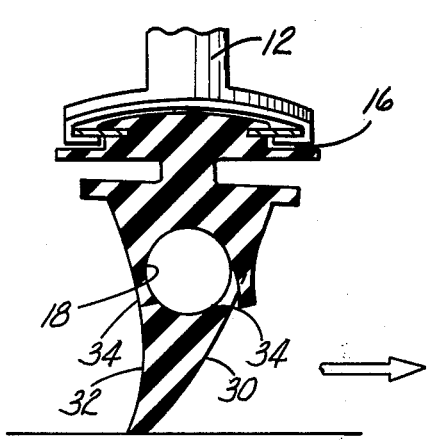
FIG. 3 is a sectional view taken substantially along the line 3—3 of FIG. 2 showing the action of the blade upon one direction of movement.
Figure 4:
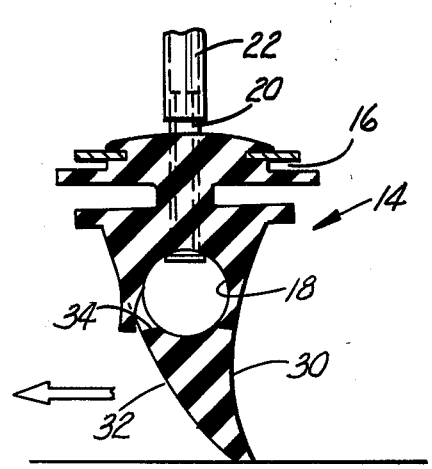
FIG. 4 is a sectional view taken substantially along the plane designated by the line 4—4 of FIG. 2 showing the action of the blade in the opposite direction of movement.

The triangular configuration of the blade 14 in transverse cross-section provides a pair of legs or faces 30 and 32 which are adapted to bear against the glass, one bearing against the glass in one direction of movement of the blade and the other on return movement of the blade in a well known manner. Formed in these legs 30 and 32 are arcuate slots 34 which extend through the legs 30 and 32 and communicate with the hollow central portion 18. Preferably the arcuate slots 34 are formed by cutting or slicing through the elastomeric material without removal of any material or any substantial portion thereof so that the slots, when formed and when the blade 14 is not under any stress in either direction, the natural elastomeric action of the material will urge the slots closed thus providing an essentially fluid tight configuration of the slots preventing fluid from oozing or dripping out of the slots in this relaxed condition. However, upon movement of the blade to the right as viewed in FIG. 3 the slots on the leg 30 will tend to open under the tension imposed on the leg 30 and the slots on the leg 32 will tend to be squeezed tight or closed under the compression action which is a reaction to the tension action on the opposite leg. This will then allow the fluid to be metered or applied in front of the blade as it is moving in its wiping action but prevent fluid to be applied to the windshield trailing the blade, thus applying the fluid directly in front of the blade as it is in its wiping mode so that there is no waste of fluid and it is all applied directly to the blade as it is wiping. Of course the opposite happens in the movement to the left as shown in FIG. 4 wherein the groove 34 on the leg 30 is closed and groove 34 on leg 30 is opened as the blade is moving in a direction to the left as viewed in FIG. 4 applying fluid in front of it.

Thus it can be seen that with the present invention the windshield wipers are actuated and the pump 28 is operated to dispense fluid from the reservoir 26 by the driver. The fluid will be pumped through the tube 22 into the hollow central portion 18 of the blade and it will be metered out by the slots alternately on one leg or the other on the blade edge as the wiping action continues applying a film of the fluid directly to the blade without waste and without need for adjustment, with the action of the blades being such to automatically meter the desired amount of fluid to the surface of the windshield directly in front of the blade as it is wiping in each direction of its stroke. The arcuate slots are sufficiently large so that they will not tend to clog and even if one of the slots does clog there are a sufficient number so that fluid will be applied to the windshield. Further, no adjustment is needed to adjust a spray and the fluid is readily available to immediately spray upon actuation of the pump directly on the surface of the windshield.

What is claimed is:

1. The combination of windshield washing and wiping blade and a fluid supply reservoir assembly comprising, an elongated blade of elastomeric material having means for securement thereof to a wiper arm, a hollow central portion thereof extending longitudinally therealong, said blade being generally triangular in cross-section, through openings formed in said blade member on the two legs that normally contact the windshield surface for communication with said hollow central portion, said openings being a plurality of generally "u" shaped slots, said slots being formed such that they are normally closed when the material is in the unstressed condition to prevent leakage therefrom and open when stressed in tension to allow fluid to pass therethrough and be dispensed in a "u" shaped pattern, flexible tube means, means to secure one end of said tube means to said blade in communication with said hollow central portion of the blade, a fluid reservoir connected to the opposite end of said flexible tube, and means to selectively pump fluid from said reservoir through said tube to the hollow central portion of said blade.

* * * * *